(12) United States Patent
Nemeth

(10) Patent No.: US 11,453,596 B2
(45) Date of Patent: Sep. 27, 2022

(54) RADICAL ANION FUNCTIONALIZATION OF TWO-DIMENSIONAL MATERIALS

(71) Applicant: Boron Nitride Power LLC, Chicago, IL (US)

(72) Inventor: Karoly Nemeth, Palatine, IL (US)

(73) Assignee: Boron Nitride Power LLC, Chicago, IL (US)

( * ) Notice: Subject to any disclaimer, the term of this patent is extended or adjusted under 35 U.S.C. 154(b) by 0 days.

(21) Appl. No.: 16/959,778

(22) PCT Filed: Feb. 28, 2020

(86) PCT No.: PCT/US2020/020383
§ 371 (c)(1),
(2) Date: Jul. 2, 2020

(87) PCT Pub. No.: WO2020/180680
PCT Pub. Date: Sep. 10, 2020

(65) Prior Publication Data
US 2021/0387857 A1    Dec. 16, 2021

Related U.S. Application Data

(60) Provisional application No. 62/813,276, filed on Mar. 4, 2019.

(51) Int. Cl.
| | | |
|---|---|---|
| C01B 32/225 | (2017.01) | |
| C01B 21/064 | (2006.01) | |
| C01B 19/00 | (2006.01) | |

(52) U.S. Cl.
CPC .......... *C01B 32/225* (2017.08); *C01B 19/007* (2013.01); *C01B 21/064* (2013.01); *C01B 21/0648* (2013.01); *C01P 2004/20* (2013.01)

(58) Field of Classification Search
CPC ..... C01B 21/064; C01B 32/184; C01B 32/19; C01B 19/007
See application file for complete search history.

(56) References Cited

U.S. PATENT DOCUMENTS

| | | |
|---|---|---|
| 3,809,762 A | 5/1974 | Gilpatrick |
| 9,105,907 B2 | 8/2015 | Mofakhari |

(Continued)

FOREIGN PATENT DOCUMENTS

| | | |
|---|---|---|
| RU | 2478077 | 4/2011 |
| WO | WO2015/006181 | 1/2015 |

(Continued)

OTHER PUBLICATIONS

Sainsbury, Toby, et al. "Oxygen radical functionalization of boron nitride nanosheets." Journal of the American Chemical Society 134.45 (2012): 18758-18771.*

(Continued)

*Primary Examiner* — Richard M Rump
(74) *Attorney, Agent, or Firm* — Rockman Videbeck & O'Connor

(57) ABSTRACT

A radical anion based functionalization of two-dimensional (2D) layered materials is proposed. The covalent functionalization of the basal plane of 2D materials with charge neutral radicals is typically unstable to reduction, leading to detachment of the functional groups from the basal plane upon reduction. This instability hinders the use of functionalized 2D materials as rechargeable electroactive species, unless the functional groups are bound to the edges of the 2D material. However, to achieve high capacity without the creation of many edges and defects, a stable functionalization of the basal plane in the reduced state is required. This goal can be achieved by radical anion functionalization, whereby the reduced/discharged state of the basal-plane-functionalized 2D material is produced. The product of the (Continued)

radical anion functionalization can be used as the discharged state of a cathode active material, solid electrolyte or part of a polymer composite.

19 Claims, 1 Drawing Sheet

(56) References Cited

U.S. PATENT DOCUMENTS

| | | | |
|---|---|---|---|
| 2010/0280138 | A1 | 11/2010 | Mofakhami |
| 2011/0091789 | A1 | 4/2011 | Mofakhami |
| 2016/0133928 | A1 | 5/2016 | Nemeth |
| 2019/0134585 | A1 | 5/2019 | Nemeth |

FOREIGN PATENT DOCUMENTS

| | | |
|---|---|---|
| WO | WO2017196738 | 11/2017 |
| WO | PCTUS2020020383 | 5/2020 |

OTHER PUBLICATIONS

Bartlett, Neil, et al. "Novel salts of graphite and a boron nitride salt." Journal of the Chemical Society, Chemical Communications 5 (1978): 200-201.*

Samanta, Khokan, et al. "Highly hydrophilic and insulating fluorinated reduced graphene oxide." Chemical Communications 49.79 (2013): 8991-8993.*

Azevedo, Joël, et al. "Localized reduction of graphene oxide by electrogenerated naphthalene radical anions and subsequent diazonium electrografting." Journal of the American Chemical Society 136.13 (2014): 4833-4836.*

Xiaowei Shen Lithium anode stable in air for low-cost fabrication of a dendrite-free lithium battery, Nature Communications, 2019.

Nobuyoshi Koga Multistep thermal decomposition of granular sodium perborate tetrahydrate a kinetic approach to complex reactions in solid gas systems, Phys. Chem. Chem Phys 2018.

Nina Kovtyukhova Reversible Intercalation of Hexagonal Boron Nitride iwth Bronsted Acides Journal of the American Chemical Society 2013.

W.G. Paterson The interation of boron triffuoride with hydrazine, Can. J. Chem. vol. 30 (1961).

James D. McClure Hydrogen Peroxide Boron Trifluoride Etherate, a New Oxidizing Agent, 1961.

Albert S. Nazraov, Functionalization and dispersion of hexagonal Boron Nitride Nanosheets treated with inorganic reagents. Chen. Asian J. 2012.

Toby Sainsbury, Oxygen Radical Functionalization of Boron Nitride Nanosheets, Journal of the American Chemical Society 2012.

Binod Kumar, Solid state, rechargeable long cycle life lithium air battery, Electrochemical Society, 2010.

Ciping Shen, Intercalation of Hexagonal Boron Nitride by Strong Oxidizers and Evidence for the Metallic Nature of the Products, JOurnal of Solid State Chemistry 1999.

Neil Bartlett, Novel salts of graphite and a boron nitride salt, J.C.S. Chem. Comm, 1978.

Karoly Nemeth Simultaneous oxygen and boron trifuouride functionalization of hexagonal boron nitride a designer cathod material for energy storage, Theoretical Chemistry Accounts 2018

* cited by examiner

RADICAL ANION FUNCTIONALIZATION OF TWO-DIMENSIONAL MATERIALS

The present application takes full benefit of U.S. provisional patent application 62/813,276, filed on Mar. 4, 2019, entitled "Synthesis of Oxy-Borohalide and Oxy-Aluminohalide Functionalized Two-Dimensional Materials by Thermal Splitting of Related Salts" by Karoly Nemeth, to the extent allowed by law. The present application also takes full benefit of International Application PCT/US20/20383 filed Feb. 28, 2020, to the extent allowed by law.

FIELD OF THE INVENTION

The present invention relates to the covalent functionalization of hexagonal boron nitride (h-BN) and graphene with Oxy-Borohalide (—$OBX_1X_2X_3$) and OxyAluminohalide (—$OA_1X_1X_2X_3$) functional groups, where X is selected from the group of halogen elements F, Cl, Br, I. Further, the invention also relates to general radical anion functionalization of two-dimensional materials.

BACKGROUND OF THE INVENTION

Figure 1A:
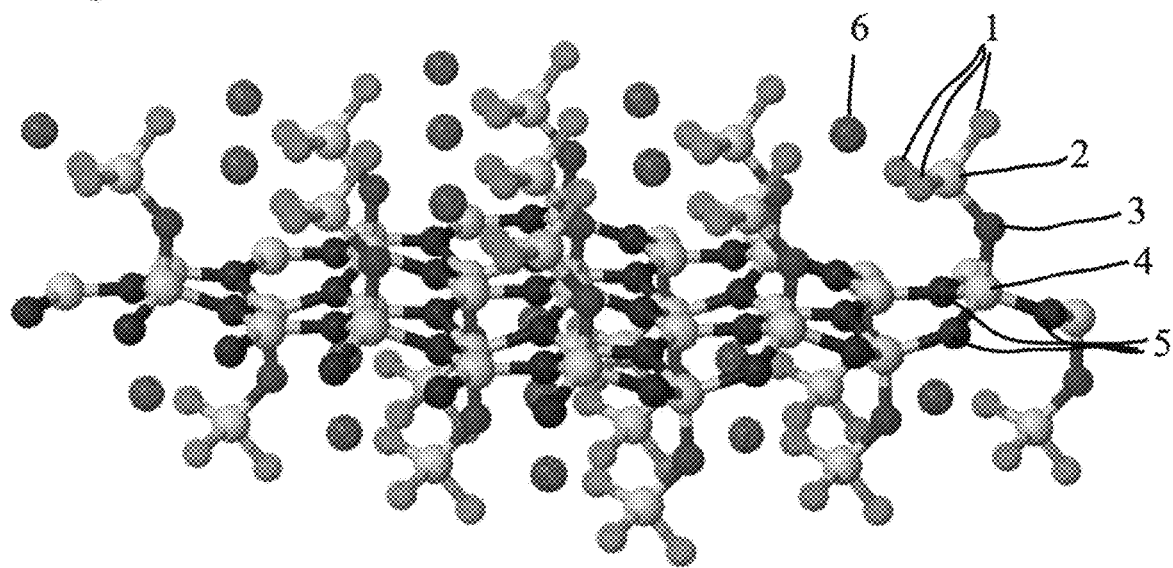
FIGS. 1A and 1B show the atomic structure of Li[$(BN)_2OBF_3$] from a perspective and a side-wise view, respectively. This structure represents the maximum packing density of —$OBF_3^-$ radical anions with $Li^+$ cations on the surface of hexagonal boron nitride (h-BN). The constituent atoms are indicated by the following numbers: fluorene (1), boron of the functional group (2), oxygen (3), boron of the h-BN (4), nitrogen (5) and lithium (6). Every second boron atom of h-BN is covalently functionalized with —$OBF_3^-$ radical anions. Li+ cations are isolated spheres on the surface. The h-BN substrate is in the central plane. The —$OBF_3^-$ radical anions are covalently bound to the boron atoms of h-BN through the oxygen atoms of these anionic radicals, while the anionic radical itself has an approximate tetrahedral structure. This atomic structure represents a discharged state of [$(BN)_2OBF_3$] positive electrode electroactive species and is both ionically and electronically conductive. Note that additional discharge capacity is possible at the expense of reduced electronic conductivity. Sodium ($Na^+$) or magnesium ($Mg^{2+}$) cations would form similar structures with [$(BN)_2OBF_3$] as described in K. Nemeth: "Simultaneous Oxygen and Boron Trifluoride Functionalization of Hexagonal Boron Nitride: A Designer Cathode Material for Energy Storage," *Theoretical Chemistry Accounts* (2018) 137-157.
Figure 1B:
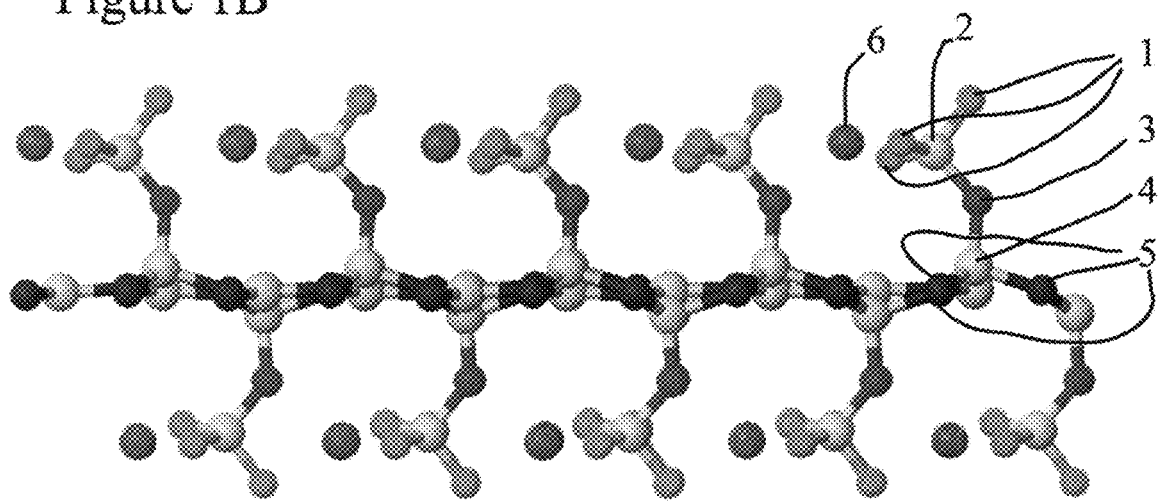

Functionalized hexagonal boron nitride (h-BN) has recently been proposed as electroactive species in cathodes of batteries in K. Németh: "Functionalized Boron Nitride Materials as Electroactive Species in Electrochemical Energy Storage Devices", WO/2015/006161, PCT/US2014/045402. One possible synthesis method for such compounds is based on the reaction of oxygen functionalized h-BN and the corresponding boron (B) or Aluminum (Al) trihalides as described in K. Nemeth, A. M. Danby and B. Subramaniam: "Synthesis of Oxygen and Boron Trihalogenide Functionalized Two-Dimensional Layered Materials in Pressurized Medium," WO/2017/196738, PCT/US17/031579. A computational analysis of these materials has been provided in K. Nemeth: "Simultaneous Oxygen and Boron Trifluoride Functionalization of Hexagonal Boron Nitride: A Designer Cathode Material for Energy Storage" *Theoretical Chemistry Accounts* (2018) 137-157.

Another approach to the synthesis of functionalized h-BN is based on the thermal splitting of peroxide compounds. The historically first such approach was based on the reaction of h-BN with the powerful oxidizing agent $(OSO_2F)_2$ as a source of .$OSO_2F$ radicals and dates back to 1978. It was published by N. Bartlett, R. Biagioni, B. McQuillan, A. Robertson and A. Thompson in "Novel Salts of Graphite and a Boron Nitride Salt," *J. Chem. Soc. Chem. Commun.* 5, 200-201 (1978). In a follow-up paper, the electrical conductivity of the corresponding functionalized h-BN, with approximate composition of $(BN)_2OSO_2F$, was found to be 1.5 S/cm which is similar to carbon black electro-conductive additives used in batteries and is about four orders of magnitude higher than that of $Li_xCoO_2$ (0<x<1), the broadly used cathode material in intercalation based Li-ion batteries. This latter measurement was published in C. Shen, S. G. Mayorga, R. Biagioni, C. Piskoti, M. Ishigami, A. Zettl, N. Bartlett (1999), "Intercalation of Hexagonal Boron Nitride by Strong Oxidizers and Evidence for the Metallic Nature of the Products," *J Solid State Chem* 147-174 (1999). Another important observation in this latter paper was that the presence of trace amounts of base-metals catalyzes the decomposition of $(BN)_2OSO_2F$ to h-BN and to a salt with $NO^+$ cations and $SO_2F^-$ anions as well as to $B_2O_3$ and to $S_2O_5F_2$ gas.

The good proton-conductivity of functionalized h-BN in the order of 0.1 S/cm has also been described in A. Mofakhami and J-F. Fauvarque (2015) "Material for an Electrochemical Device." U.S. Pat. No. 9,105,907, and good Li-ion conductivity of h-BN containing membranes has been observed in B. Kumar, J. Kumar, R. Leese, J. P. Fellner, S. J. Rodrigues, K. Abraham: "A Solid-State, Rechargeable, Long Cycle Life Lithium-Air Battery," *J. Electrochem. Soc.* 157, A50-54 (2010).

Molecules of $(OSO_2F)_2$ contain a peroxo group (—O—O—) that is functionalized with fluorosulfonyl groups from both side, resulting in a structure of $FO_2S$—O—O—$SO_2F$. This peroxo bond breaks up easily, even at room temperature as described in the above works, and provides —$OSO_2F$ radicals.

The peroxo bond, can however be functionalized by many other functional groups, not only with —$SO_2F$. Another example is the tert-butyl group, —$C(CH_3)_3$, and the corresponding organic tert-butyl-peroxyde, $(OC(CH_3)_3)_2$, has been used for functionalization of h-BN in T. Sainsbury, A. Satti, P. May, Z. Wang, I. McGovern, Y. K. Gunko and J. Coleman: "Oxygen Radical Functionalization of Boron Nitride Nanosheets," *J. Am. Chem. Soc.* 134, 18758 (2012). Even simple hydrogen peroxide, $H_2O_2$ is an effective agent to functionalize h-BN through splitting the peroxide bond and providing —OH radicals, see e.g A. S. Nazarov, V. N. Demin, E. D. Grayfer, A. I. Bulavchenko, A. T. Arymbaeva, H-J. Shin, J-Y. Choi, V. E. Fedorov, "Functionalization and Dispersion of Hexagonal Boron Nitride (h-BN) Nanosheets Treated with Inorganic Reagents," *Chem. Asian. J.* 7, 554-560 (2012) and in V. Fedorov, A. Nazarov, V. Demin: "Method of Producing Soluble Hexagonal Boron Nitride," Russian Patent RU 2478077 C2 (2013).

There is clearly a need to find the most effective functionalization reactions for 2D materials in order to exploit their beneficial properties in energy storage, solid electrolytes, electroactive species, composites and many other fields.

SUMMARY OF THE INVENTION

The present invention is directed to the radical anion functionalization of 2D layered materials, whereby the 2D layered material is reacted with a salt containing a radical anion and the radical anion covalently binds to the 2D layered material forming a salt of a covalently functionalized 2D material. This novel functionalized material may be used as solid electrolyte and/or electroactive species in electrochemical energy storage devices. Further, it may be used as a component of composite materials, such as polymeric composites with good ionic conductivity and heat stability.

DETAILED DESCRIPTION OF THE INVENTION

All of the above-identified prior art use charge neutral radicals, such as those derivable from charge neutral peroxides, to achieve the functionalization of the basal plane of h-BN and other 2D-materials. However, ionic peroxides, and radical anion containing salts in general, present a new opportunity to achieve the functionalization of h-BN and produce a reduced form of functionalized h-BN and 2D materials. Examples of such functionalized h-BN-s include $Li[(BN)_2OBF_3]$, $Na[(BN)_{20}BF_3]$ and $Mg[(BN)_2OBF_3]$: they correspond to discharged versions of a battery cathode active material $(BN)_2OBF_3$, when combined with Li, Na and Mg anodes, respectively, as proposed in the above mentioned work by K. Nemeth: "Simultaneous Oxygen and Boron Trifluoride Functionalization of Hexagonal Boron Nitride: A Designer Cathode Material For Energy Storage," *Theoretical Chemistry Accounts* 137-157 (2018). The new insight in the present invention is that these salts of functionalized h-BN can be derived as reaction products of h-BN with ionic peroxides $Li_2[(OBF_3)_2]$, $Na_2[(OBF_3)_2]$ and $Mg[(OBF_3)_2]$, when the anions of these latter salts split to radical anions through an activation process. These latter salts in turn can be composed as reaction products of peroxides $Li_2O_2$, $Na_2O_2$ and $MgO_2$ containing the Lewis base peroxide anion, with Lewis acid $BF_3$:

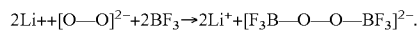

$$2Li^+ + [O\text{---}O]^{2-} + 2BF_3 \rightarrow 2Li^+ + [F_3B\text{---}O\text{---}O\text{---}BF_3]^{2-}.$$

Similar reactions occur with Na and Mg peroxides. Other Lewis acids, such as $BCl_3$, $SO_2$ or $SO_3$ may also be used to synthesize similar salts with anions containing a peroxo bond. Note that ether solution based complexes of $BF_3$ with $H_2O_2$ are well known oxidizing agents in organic chemistry as described first in J. D. McClure and P. H. Williams: "Hydrogen Peroxide—Boron Trifluoride Etherate, a New Oxidizing Agent," *The Journal of Organic Chemistry* 27, 24-26 (1962).

Due to the electron withdrawing effect of the Lewis acid functionalization, the peroxo bond in the above salts will be relatively weak and can be split thermally upon heating the salt. The split anions will be a source of —O—$BF_3^-$ radical anions that are capable to functionalize h-BN in a similar way as other radicals did in previously published works. Therefore, the reaction of h-BN with the melt of these salts results in salts of functionalized h-BN corresponding to discharged states of the cathode active functionalized h-BN species.

In addition to the above reaction of peroxide salts with Lewis acids, other salts may also be used in place of the peroxides. Such salts may be oxides, carbonates and oxalates. The reaction of these latter salts with $BF_3$ would evolve $CO_2$ and CO and provide $[OBF_3]^{2-}$ anions for the functionalization of h-BN. A similar reaction between $NaHCO_3$ and $BF_3$ in aqueous solution has been known for long and produces $CO_2$ and $NaOH.BF_3$ complex, as described in U.S. Pat. No. 3,809,762 by L. O. Gilpatrick entitled "Synthesis of Sodium Hydroxytri-Fluoroborate." In fact, the $NaOH.BF_3$ complex can also be used as a source of radical anions: the $NaOH.BF_3$ complex intercalates the layered 2D material from the melt or evaporating concentrated solution of $NaOH.BF_3$, then the protons are electrochemically extracted and removed as $H_2$ gas from the system leaving behind NaOBF3-functionalized h-BN. Similar intercalation of Bronstead acids into h-BN has been observed in N. I. Kovtyukhova, Y. Wang, R. Lv, M. Terrones, V. H. Crespi, and T. E. Mallouk: "Reversible Intercalation of Hexagonal Boron Nitride With Brsnsted Acids." *Journal of the American Chemical Society* 135, 8372-8381 (2013).

The above concept can further be generalized beyond peroxo-group containing ionic compounds. Ionic compounds with a radical anion or an anion that is a source of radicals by an activation process can perform similar functionalizations. The activation process may be thermal, electrochemical ultraviolet light-based, mechanical, such as ball-milling based, or other. Even further, not only h-BN, but general two-dimensional materials, such as graphene, $MoS_2$, Xenes, MXenes and others may be functionalized by such sources of radical anions.

In a first embodiment, solid peroxides $Li_2O_2$, $Na_2O_2$ and $MgO_2$ are reacted with a cold ether solution of $BF_3$ to form the corresponding Lewis adducts $Li_2[(OBF_3)_2]$, $Na_2[(OBF_3)_2]$ and $Mg[(OBF_3)_2]$, respectively. After the removal of the solvent, and drying of the products, these adducts are molten slightly above their melting points and are reacted with h-BN, to form stacked functionalized monolayers of h-BN, with approximate compositions of $Li[(BN)_2OBF_3]$, $Na[(BN)_2OBF_3]$ and $Mg[(BN)_2OBF_3]_2$.

In a second embodiment, the Lewis adducts are formed from the solid peroxides dissolved or dispersed in water and gaseous $BF_3$ is bubbled into this medium until all peroxides are converted to the corresponding Lewis adducts. The rest of the process is identical with the first embodiment.

In a third embodiment, the Lewis adducts are formed by the reaction of the solid peroxides with liquid $BF_3$.

In a fourth embodiment, general boron halides are used instead of $BF_3$, otherwise the same processes are used as in the previously described embodiments.

In a fifth embodiment, salts with $BF_3OH^-$ anions are formed by the reaction of $BF_3$ gas with aqueous solution of hydroxides or carbonates or hydrocarbonates or oxalates. After evaporation of the solvent, the melt of these salts is mixed with h-BN and then one proton and one electron per formula unit of the $BF_3OH^-$ anions are electrochemically removed on the cathode by converting them to $H_2$ gas and the resulting —$OBF_3^-$ anionic radicals covalently functionalize h-BN.

In a sixth embodiment, h-BN is reacted with a mixture of concentrated hydrogen-peroxide ($H_2O_2$) and $BF_3$. The $BF_3$ may come from an ether solution, or as gas bubbled into the $H_2O_2$ solution. Such a mixture contains Lewis adducts of ($H_2O_2$) with $BF_3$ and these adducts are acidic, containing protons and $[F_3B\text{---}O\text{---}O\text{---}BF_3]^{2-}$ or $[HO\text{---}O\text{---}BF_3]^-$ anions. Spontaneous decomposition of the peroxide bonds happens at room temperature or at elevated temperatures in these solutions and the resulting radicals functionalize the h-BN layers with —$OBF_3^-$ radical anions. The protons may electrochemically or otherwise be exchanged to Li cations.

In a seventh embodiment, Lewis adducts of hydrazine ($N_2H_4$) with $BF_3$ are formed, such as $2BF_3.N_2H_4$ or $BF_3.N_2H_4$, for example by following the methods described in W. G. Paterson and M. Onyszchuk: "The Interaction of Boron Trifluoride with Hydrazine", Canadian Journal of Chemistry 39, 986-994 (1961). These adducts will also be acidic. By thermal splitting of the N—N bonds in the hydrazine units, —NH—$BF_3^-$ radical anions form that functionalize h-BN. The protons can, again, be exchanged to $Li^+$ electrochemically or by other means.

In an eighth embodiment, the radical anions may be generated by electrochemical extraction of cations other than protons. For example, salts containing $BF_3O^{2-}$ anions, such as $Li_2OBF_3$, would be converted to $LiOBF_3$, by the extraction of one Li cation and one electron per formula unit to generate the —$OBF_3^-$ radical anions.

In a ninth embodiment, the source of radical anions is perborates. A well known example of perborates is sodium perborate, $Na_2B_2O_8H_4$, which is a well known bleaching agent and is produced on an industrial scale. The thermal decomposition of $Na_2B_2O_8H_4$ has been studied in N. Koga, N. Kameno, Y. Tsuboi, T. Fujiwara, M. Nakano, K. Nishikawa, and A. I. Murata, "Multistep Thermal Decomposition of Granular Sodium Perborate Tetrahydrate: A Kinetic Approach to Complex Reactions in Solid-Gas Systems." *Physical Chemistry Chemical Physics* 20, 12557-12573 (2018). The anions of perborate salts contain a six-membered ring of two peroxide (—O—O—) bridges between two boron atoms, while each of the boron atoms have two other additional covalently bound functional groups attached, such as hydroxyl or fluoro groups and the whole anion collectively carries two negative charges. When activated (by heat, ball milling, etc), the peroxide bridges break up between the oxygen atoms and the anions split into two radical anions. The reaction of these radical anions with 2D materials leads to radical anion functionalized 2D materials.

Mechanical activation of the functionalizing anions is also possible. For example, ball milling or ultrasonication in a solvent may cause the splitting of the peroxide bonds and generate the radical anions.

The above described embodiments can also be carried out with other than h-BN 2D materials, for example with graphite/graphene or with MXenes, etc. Instead of $BF_3$, other Lewis acids may also be used, such as $BCl_3$, $AlF_3$ or $AlCl_3$.

Further generalization of the above processes is possible through using radical anions that are not derived from splitting Lewis adducts containing O—O or N—N bonds, but where the radical anion is provided from an entirely general source in the form of a salt. For example, the above mentioned process when one Li per formula unit is electrochemically extracted from $Li_2O.BF_3$ is a way to produce a salt $LiOBF_3$ containing a radical anion $OBF_3^-$.

One possible example for utilization of salts of radical anion functionalized h-BN besides electroactive species and electrolytes is in coating applications. For example, a metallic lithium electrode may be coated by such salts of h-BN to provide an ionically conductive and fireproof coating that also avoids dendrite formation and allows for working with metallic anodes on air, without causing corrosion of these anodes. Similar coatings using graphite/graphene fluoride have been described in X. Shen, Y. Li, T. Qian, J. Liu, J. Zhou, C. Yan, and J. B. Goodenough: "Lithium Anode Stable in Air for Low-Cost Fabrication of a Dendrite-Free Lithium Battery," *Nature Communications* 10, 1-9 (2019). The advantage of a boron nitride coating as opposed to graphite fluoride is higher thermal stability.

It is to be understood that the above-described embodiments are only illustrative of the application of the principles of the present invention. Numerous modifications and alternative arrangements may be devised by those skilled in the art without departing from the spirit and scope of the present invention and the appended claims are intended to cover such modifications and arrangements. It is intended that the scope of the invention not be limited by the specification, but be defined by the claims set forth below.

All publications and patent documents cited in this application are incorporated by reference in their entirety for all purposes to the same extent as if each individual publication or patent document were so individually denoted.

I claim:

1. A method for the synthesis of functionalized two-dimensional (2D) layered materials comprising:
providing a 2D layered material in one of a stacked form and an exfoliated form;
providing a first salt with an anion;
reacting the anion of the first salt with a Lewis acid forming a second salt;
activating the second salt to produce radical anions;
reacting the radical anions with the 2D layered materials to obtain a third salt of functionalized 2D layered materials.

2. The method of claim 1 wherein the first salt is a peroxide.

3. The method of claim 1 wherein the first salt is one of a carbonate and a hydrocarbonate.

4. The method of claim 1 wherein the first salt is an oxalate.

5. The method of claim 1 wherein the first salt is one of a hydroxide or an oxide.

6. The method of claim 1 wherein the Lewis acid is a boron trihalide, $BX_1X_2X_3$, where $X_1$, $X_2$ and $X_3$ are each individually selected from the group of the halogen elements F, Cl, Br, and I.

7. The method of claim 1 wherein the Lewis acid is an aluminum trihalide, $AlX_1X_2X_3$, where $X_1$, $X_2$ and $X_3$ are each individually selected from the group of the halogen elements F, Cl, Br, and I.

8. The method of claim 1 wherein the Lewis acid is sulfur-dioxide, $SO_2$.

9. The method of claim 1 wherein the Lewis acid is sulfur-trioxide, $SO_3$.

10. The method of claim 1 wherein the activation is accomplished by heating.

11. The method of claim 1 wherein the activation is accomplished by ultrasonication.

12. The method of claim 1 wherein the activation is accomplished by electrochemical means.

13. The method of claim 10 wherein the activation occurs in a melt phase of the second salt.

14. The method of claim 11 wherein the activation occurs in a solution of the second salt.

15. The method of claim 14 wherein the solution is based on a solvent that is one of liquid $BF_3$, liquid $BCl_3$, molten $AlF_3$, and molten $AlCl_3$.

16. The method of claim 1 wherein the 2D layered material is hexagonal boron nitride.

17. The method of claim 1 in which the 2D layered material is graphite.

18. The method of claim 5 wherein the activation is based on electrochemical removal of one of protons and other cations from the second salt producing corresponding radical anions.

19. A method for the synthesis of functionalized two dimensional (2D) layered materials comprising:
providing a 2D layered material in one of a stacked form and an exfoliated form;

providing Lewis adducts of Lewis acids of one of boron trihalides and aluminum trihalides with Lewis bases of one of hydrogen peroxide and hydrazine;

mixing the Lewis adduct with the 2D material;

activating the Lewis adduct to break up the O-O and N-N bonds and produce acidic radicals containing protons and radical anions;

reacting the radical anions with the 2D material to obtain radical anion functionalized acidic 2D material.

\* \* \* \* \*